United States Patent
Murashenkov et al.

(10) Patent No.: US 9,148,379 B1
(45) Date of Patent: Sep. 29, 2015

(54) METHOD AND SYSTEM FOR PRIORITIZING AUDIO TRAFFIC IN IP NETWORKS

(71) Applicant: "Intermind" sociétéà responsabilité limitée, Luxembourg (LU)

(72) Inventors: Dmitry Murashenkov, Moscow (RU); Alexander Strikhalev, Moscow (RU)

(73) Assignee: "Intermind" sociétéà responsabilité limitée, Luxembourg (LU)

( * ) Notice: Subject to any disclaimer, the term of this patent is extended or adjusted under 35 U.S.C. 154(b) by 209 days.

(21) Appl. No.: 13/737,048

(22) Filed: Jan. 9, 2013

(51) Int. Cl.
| | | |
|---|---|---|
| *H04L 12/819* | (2013.01) | |
| *H04L 1/00* | (2006.01) | |
| *H04L 12/26* | (2006.01) | |
| *H04L 29/06* | (2006.01) | |

(52) U.S. Cl.
CPC ............ *H04L 47/215* (2013.01); *H04L 1/0007* (2013.01); *H04L 29/06027* (2013.01); *H04L 12/2697* (2013.01)

(58) Field of Classification Search
CPC .............. H04L 1/0007; H04L 12/5693; H04L 12/2697
USPC ........... 709/231, 218, 235; 370/468, 235, 238
See application file for complete search history.

(56) References Cited

U.S. PATENT DOCUMENTS

| | | | |
|---|---|---|---|
| 6,081,507 A | 6/2000 | Chao et al. | |
| 6,370,144 B1 | 4/2002 | Chao et al. | |
| 6,389,031 B1 | 5/2002 | Chao et al. | |
| 6,862,265 B1* | 3/2005 | Appala et al. | 370/235 |
| 6,996,064 B2* | 2/2006 | Klassen et al. | 370/238 |
| 7,266,613 B1* | 9/2007 | Brown et al. | 709/235 |
| 7,272,112 B2* | 9/2007 | Lin | 370/230 |
| 7,542,417 B2 | 6/2009 | Babonneau et al. | |
| 7,826,358 B2* | 11/2010 | Caram | 370/230 |
| 2007/0058548 A1 | 3/2007 | Babonneau et al. | |
| 2007/0071030 A1* | 3/2007 | Lee | 370/468 |
| 2009/0021572 A1 | 1/2009 | Garudadri et al. | |
| 2009/0147787 A1* | 6/2009 | Arulambalam et al. | 370/392 |

OTHER PUBLICATIONS

Wikipedia, Token Bucket—Wikipedia, the free encyclopedia, Dec. 7, 2011, Wikipedia.org, http://web.archive.org/web/20111207204433/http://en.wikipedia.org/wiki/Token_bucket.*

* cited by examiner

*Primary Examiner* — David Lazaro
*Assistant Examiner* — Zi Ye
(74) *Attorney, Agent, or Firm* — Bardmesser Law Group

(57) ABSTRACT

A method for continuous uninterrupted delivery of audio packets, especially, in low-bandwidth/high-delay networks. The method determines a guaranteed communication channel capacity for selecting an optimal quality of real-time video rendering. A capacity of the communication channel between a client and a server is limited by a token bucket filter (TBF). In case of low-bandwidth, some or all video data is discarded and only the audio data is sent. Thus, the remote conference continues uninterrupted.

9 Claims, 4 Drawing Sheets

METHOD AND SYSTEM FOR PRIORITIZING AUDIO TRAFFIC IN IP NETWORKS

BACKGROUND OF THE INVENTION

1. Field of the Invention

The present invention relates to automated network traffic management, and more particularly, to prioritization of audio traffic in IP networks. The invention is applicable to both TCP/IP networks, as well as to other IP networks.

2. Description of the Related Art

Currently, there are a number of conventional methods that relate to organization of network traffic management. However all IP-based networks experience packet jams where some packets are dropped or otherwise not delivered. Network channel bandwidth can often be insufficient for passing combined video-audio traffic. Modern video conferencing systems depend on reliable delivery of video-audio packets. The video-audio packets typically jam the channel once the channel capacity changes for a brief moment, and video conference participants lose both picture and sound. However, the sound (i.e., the audio packets) is more important for the purposes of video conferencing. Modern video conferencing systems do not separate audio and video data that is transferred as a combined network media data.

The primary disadvantage of such approach is that when the channel bandwidth is insufficient or becomes temporarily insufficient, the media data requited for video conferencing is not delivered in a consistent manner, and the conference cannot continue. The conventional video conferencing systems do not have means for separating audio and video packets and delivering only the audio data when the bandwidth capacity is low.

Conventional TCP congestion avoidance algorithms determine a current communication channel speed and do not allow a client (or server) to transmit data faster than the channel speed to avoid overload of the network. However, all of the conventional algorithms determine the correct speed only if the communication channel is used to 100% of its capacity. In other cases the current speed is determined incorrectly. This is because two types of congestion avoidance algorithms exist: loss-based (if a packet is lost, then it is assumed that the network is congested) and delay-based (if roundtrip time increases, then it is assumed that the network is congested). If none of these problems are observed, all existing algorithms assume that the network still has additional capacity and increase their estimate of available bandwidth. But on underutilized networks these problems would never be observed, and so the estimate will grow indefinitely.

Accordingly, there is a need in the art for an effective and efficient method for uninterrupted delivery of audio data to video conference participants based on a correct speed of the communication channel.

SUMMARY OF THE INVENTION

The present invention relates to automated network traffic management, and more particularly, to prioritization of audio traffic in IP networks that substantially obviates one or more of the disadvantages of the related art.

In one aspect, there is provided a method for continuous uninterrupted delivery of the audio packets especially in low-bandwidth/high-delay networks. The method determines a guaranteed communication channel capacity for selecting an optimal quality of real-time video rendering. According to an exemplary embodiment, a capacity of the communication channel between a client and a server is limited by a token bucket filter (TBF).

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Figure 1:
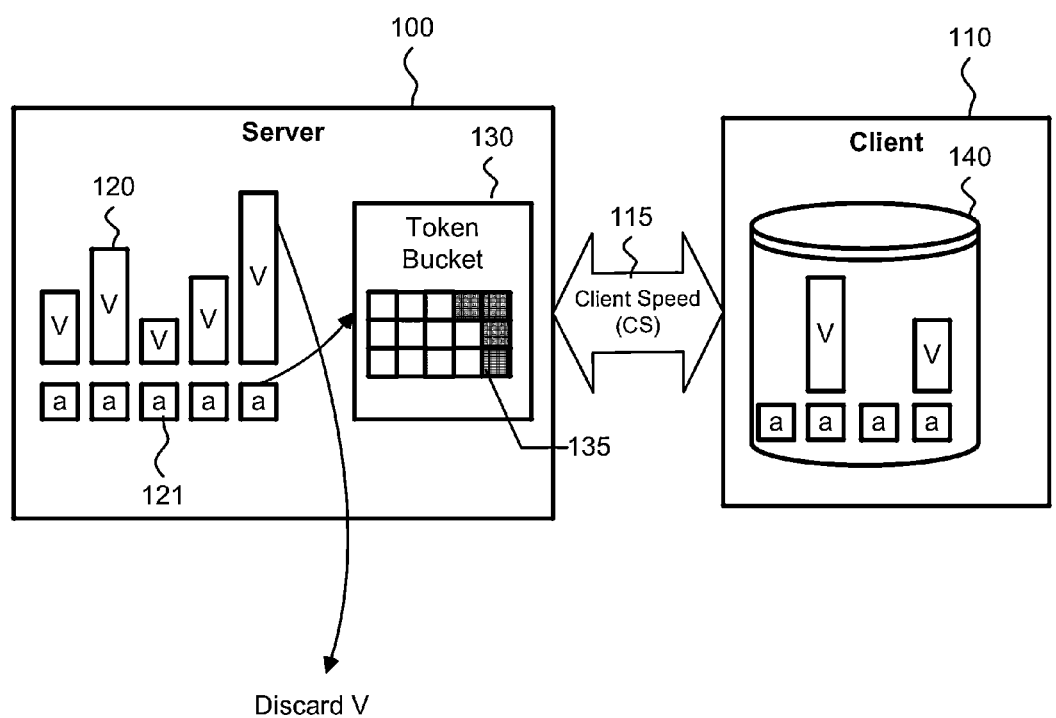
FIG. 1 illustrates a client-server system, in accordance with the exemplary embodiment.

Reference will now be made in detail to the embodiments of the present invention, examples of which are illustrated in the accompanying drawings.

A method, system and computer program product for prioritization of audio traffic in IP networks is provided. The method, in accordance with the exemplary embodiment, provides for continuous uninterrupted delivery of audio packets especially in low-bandwidth/high-delay networks.

Additionally, the method provides for a smooth real-time video rendering in cases of peaks of volumes (due to video compression and processing) of transferred media data. The method determines a guaranteed communication channel capacity for selecting an optimal quality of real-time audio/video rendering. According to an exemplary embodiment, a bandwidth capacity of the communication channel between a client and a server is limited by a token bucket filter (TBF).

The TBF algorithm is used for limiting the bandwidth capacity of the communication channels. This algorithm is used for optimization of routing of the network traffic. The TBF uses a data bucket in a form of a data buffer. The new data is placed into a client buffer upon arrival. A token bucket is used for storing tokens. A number of tokens gradually increases. For example, one token can equal to one byte of data. Generally, the bandwidth can be expressed as so many tokens per unit time. A speed of increasing of the number of tokens in the bucket corresponds to a limit of the data transmission speed.

For example, as soon as N tokens are collected, the N data blocks are taken out of the data bucket (buffer) and sent over the network. Used tokens are discarded from the token bucket. In an ideal situation N=1. In other words, as soon as at least one token is present, the data from the queue is sent immediately. According to the exemplary embodiment, only the token bucket is used for sending the media data. The proposed method is executed as follows:

a client establishes a connection with the server;

a speed of the connection N is considered to be a speed of the media stream;

a token bucket is created on the server for the client-server connection. The tokens are added into the bucket at a speed of N tokens per second;

when the server needs to send a video frame to the client, the process determines the size of the video frame and the number of tokens currently contained in the token bucket. If the number of the tokens exceeds the video frame size, the video frame is sent to the client and the used tokens are discarded from the token bucket. If the number of tokens is smaller than the video frame size, the video frame is discarded and the number of the tokens in the token bucket remains unchanged. Since the number of tokens=number of bytes, if frame of size 100 bytes arrives, this corresponds to 100 tokens.

According to the exemplary embodiment, the method can operate in two modes—a monitor mode and a probe mode. The monitor mode determines a connection speed and prioritizes audio data over video data using a frame filter. The probe mode determines connection speed, and the monitor mode only shapes the data stream (by dropping packets) so that it conforms to determined bandwidth.

The probe mode fills the communication channel with "garbage" or junk data in order to determine the channel speed used in monitor mode.

FIG. 1 illustrates a client-server system, in accordance with the exemplary embodiment. A server 100 is a media server, which serves media data to a client 110 over a communication channel 115. The media data comprises video data 120 and audio data 121. The server 100 has a token bucket (TBF) 130 filled with tokens 135. The server 100 sends media data to the client 110, which uses a client media buffer 140 for storing the media data (audio and video).

In the probe mode, the process can determine that channel's 115 real speed has changed to N1, for example. Then, the process changes the setting of the existing token bucket 130 for the channel 115, so a number of the tokens 135 in the token bucket 130 increases at the speed N1. According to the exemplary embodiment, a TBF 130 size (i.e., a bucket size BS) is selected based on a media buffer 140 size used in a client's video conferencing application (i.e., client buffer size CB) and based on client-server channel 115 client speed (CS). CB can be measured in seconds. This corresponds to a maximum gap between adjacent frames' arrival to client that is allowed for media to be played on the client without visual gaps. If a client has a buffer of 1 second, it can tolerate for all frames for the next second to arrive as a burst, only once per second. If frames are delayed for 1.5 seconds there would be a gap in playback for that 0.5 seconds. If they are delayed for 0.5 seconds they will simply wait in the client buffer. The TBF 130 size can be calculated as:

$$BS=CS*CB$$

For example, if a size of the media buffer 140 is 300 ms (0.3 sec) and the channel 115 speed is set as 500 Kb/s, the buffer size equals 500*0.3=150 Kb (approximately 19 Kbytes).

Note that CB can be set automatically for better network utilization, and can be set to a larger value for better network utilization. (Setting it to lower value will reduce network utilization.) It is assumed that current CB size is known on server (which is usually the case). However, a network delay can increase and negatively affect video conferencing process. Thus, in order to choose the media buffer 140 size one needs to consider that a maximum delay equals:

$$RTT/2+CB,$$

where RTT is a round trip time between sending a request from the client and receiving an answer from the server. According to the exemplary embodiment, a maximum size of a transmitted video frame cannot exceed the BS.

According to the exemplary embodiment, in the monitor mode, the process uses the connection speed between the client and the server and prioritizes the audio data over the video data. The audio data is assigned a higher priority rating than the video data by a frame filter. The frame filter (FF) is called each time a media server needs to send the media data to the client. The FF is a virtual device that has a TBF associated with it. The TBF is configured with detected client connection bandwidth. The FF is invoked each time the server needs to send packet to client, and the FF makes a decision if the packet should be sent or dropped. The FF passes all traffic conforming to the TBF "as is", and in case of non-conforming traffic, it drops video frames until the traffic conforms to TBF. Audio frames are never dropped by the FF, and this behavior results in prioritizing audio over video.

The process calculates bucket size BS as: BS=CS*CB, where CS is the connection speed and CB is a client buffer size. Otherwise, if the speed (CS) is not determined, the bucket size BS is set equal to the volume of the media stream to be sent.

The process can check the video frame depends on a previous base frame that has been discarded. Note that some video frames are base frames ("intra-predicted frames") containing a lot of video data. Some other video frames are supplemental small frames ("inter-predicted frames") depending from the base frame. If the particular supplemental video frame depends from the previous base frame that has been discarded, the process discards the supplemental video frame as well.

Figure 2:
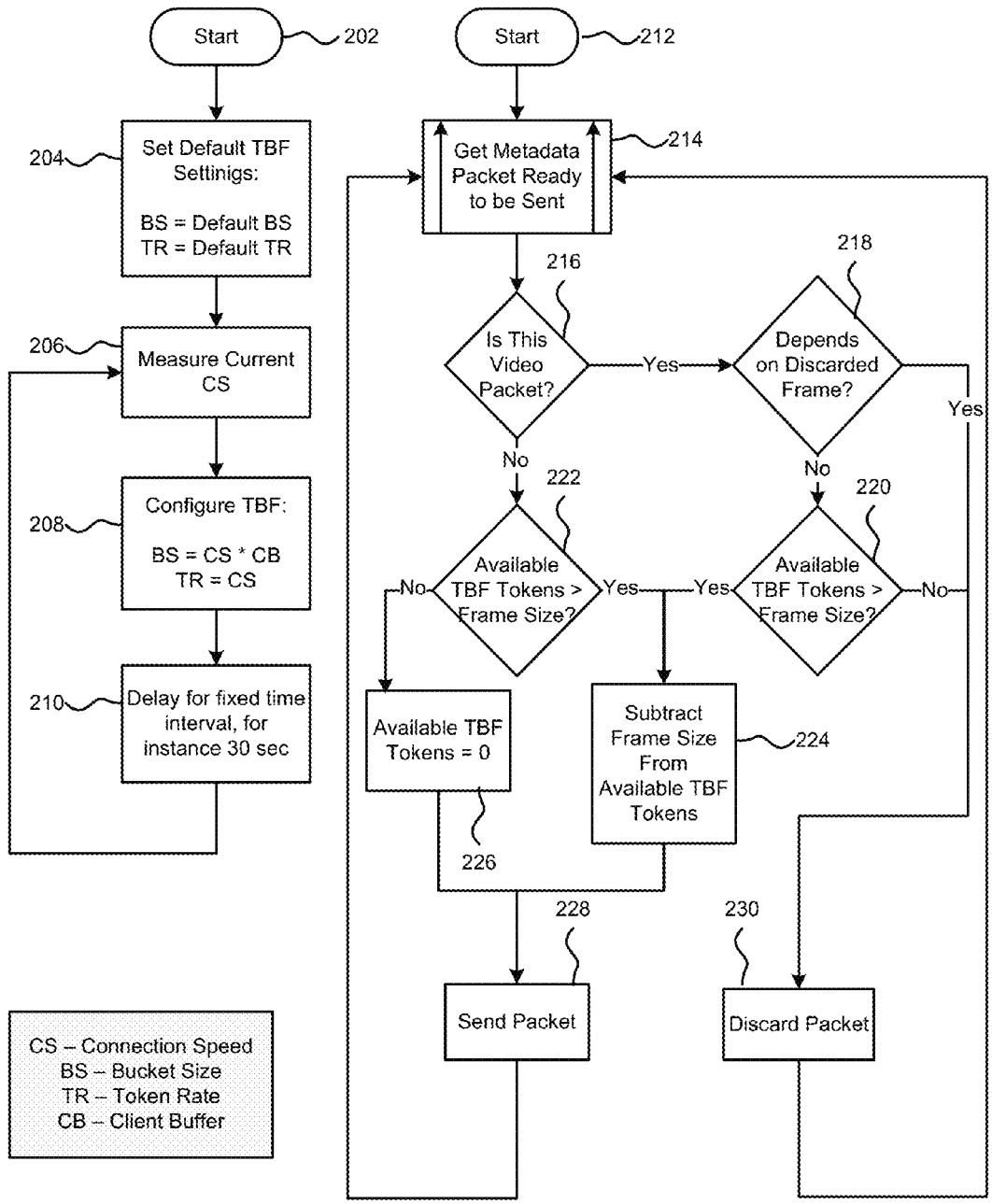
FIG. 2 illustrates a flow chart of a method, in accordance with the exemplary embodiment.

FIG. 2 illustrates a flowchart of a method according to the exemplary embodiment. As shown in FIG. 2, the process starts in step 202. Then, in step 204, the default settings of the token bucket filter are set. In step 206, the current connection speed is measured. In step 208, the token bucket filter is configured. In step 210, the system introduces a fixed time delay interval, for example, 30 seconds. The process then returns to step 206, to continue measuring the current connection speed.

As further shown in FIG. 2, in step 212, the process of adjusting the connection speed begins. In step 214, a metadata packet is prepared for sending. In step 216, the system determines if this is a video packet. If it is, then the system determines if the packet depends on a discarded frame (in step 218). If yes, then the packet is discarded in step 230, and the process returns to step 214. If no, then the process checks, in step 220, if the number of available tokens in the token bucket filter is larger than the size of the frame. If no, then the packet is discarded, as in step 230. If yes, then the frame size is subtracted from the available tokens in the token bucket filter, in step 224. The packet is then sent, in step 228, and the process returns to step 214.

In step 216, if the packet is not a video packet, then, in step 222, the process checks if the number of available tokens is larger than the frame size. If yes, then the system proceeds to step 224, as above. If no, then, in step 226, the number of available tokens in the token bucket filter is set to zero, and the process proceeds to step 228 to send the packet.

According to the exemplary method, the connection speed is determined as follows:

A number of bytes located in the TCP send buffer (at the initial point of a time interval) is added to a number of bytes written into the TCP socket over the time interval. Then, a number of bytes left in the TCP sent buffer by the end of the time interval is subtracted from a resulting sum and divided by the time interval.

Alternatively, the speed can be calculated based on a change of the TCP sequence over the time interval divide by the time interval. The connection speed calculation method can be selected base on the API of an operating system, or can be developed on the application side to support non-TCP networks by sending acknowledgement packets to the server for each received packet. In case when the measured speed is significantly less than the volume of the transmitted data, the size of the TBF buffer needs to be changed prior to sending the media data. After the connection speed is determined, it is set as a TBF parameter, so that the TBF can say if the media data conforms to this speed.

According to the exemplary embodiment, the audio data is prioritized over the video data. The prioritization process is performed each time the media server needs to send a portion of the media data (audio, video and system data) to the client. The audio data is assigned a higher priority rating than the video data by a frame filer. Thus, in case of a limited bandwidth capacity of the communication channel(s) some or entire video data is discarded (see FIG. 1). The videoconferencing application on the client side renders the last correct video frame when other video frames are discarded, as provided for by the video codec.

According to the exemplary embodiment, the communication channel transfers video packets, audio packet and system data packets, and other data packets (e.g., chat messages sent using the video transport channel). The process (i.e., a media processing algorithm) only discards some of the video packets. In the worst case scenario, the audio packets and the system data packets remain in the data stream being transferred, while all video packets are filtered out and discarded.

According to the exemplary embodiment, a video frame is discarded if there are not enough TBF tokens in the token bucket at the time of sending the video frame. However, if the audio packet or the system packet needs to be transferred while there are not enough tokens in the token bucket, the packet is sent anyways. The TBF tokens are taken (i.e., written off) for each sent packet (video, audio, system or garbage). Note that the number of tokens cannot be less than zero. Therefore, if, after the packet is sent, more tokens need to be taken off than the existing number of the tokens in the TBF bucket, zero tokens are assigned to the TBF.

Standard algorithms for TCP congestion avoidance determine correct connection speed only if the communication channel is used at 100% of its capacity. Otherwise the speed is determined incorrectly. According to the exemplary embodiment, the 100% load is provided by adding junk data packets to the channel traffic. However, the junk data is real data that goes through the network routers located between the client and the server. The routers limit the traffic and demonstrate the real connection speed between the client and the server.

The method for determining connection speed is implemented as follows:

1. At the beginning of the probe mode, the speed N is known. This speed is either measured before or is accepted as a default speed for this client-server connection. This means that the server TBF does not allow to transfer data at the speed greater than N (extra data is discarded);

2. The probe mode tests if the connection can transfer data at a speed and N+delta;

3. The TBF settings are changed for the speed N+delta;

4. At the moment of sending a data packet form the server, the process checks how many tokens are left in the TBF and sends the same amount of garbage data packets in order to use all the tokens;

5. During the probe mode phase (N+delta)*Tp bytes are sent (i.e., written into the socket), where the Tp is the duration of the probe mode phase, which is usually 1-5 seconds. Too short a time will give unreliable results, and too long a time may overload the network and worsen user experience. A portion of the sent data is a real useful data and a portion of the data is the garbage data.

6. After the probe mode phase is over, the process can see how many bytes have been transferred, which indicates the actual connection speed M. Then, the TBF is reset for the speed M and the process begins the monitor mode. The next probe phase tests the speed M+delta. The delta is usually about 50-200 Kbits/sec. Too short a time will give unreliable results (there can be some bandwidth detection error due to changing network conditions), and too long a time may overload the network and worsen user experience.

According to the exemplary embodiment, the described process is implemented on a server side of the video conferencing system. The process controls the media data sent to the client from the server. Note that the algorithm can be implemented in any application that sends data. Thus, if a client sends his own video to the server, the algorithm can be implemented on the client.

Figure 3:
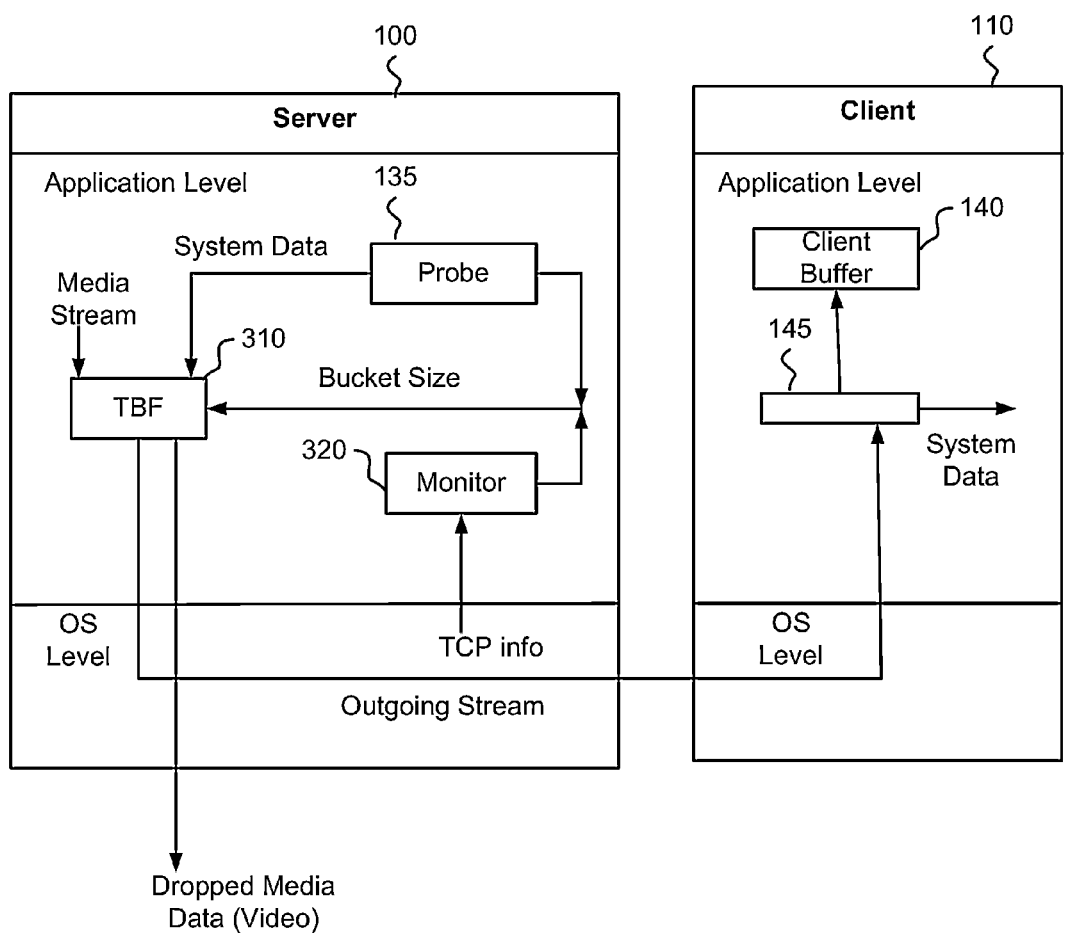
FIG. 3 illustrates how the proposed method is implemented on the server system.

FIG. 3 illustrates how the proposed method is implemented on the server system. The TBF 310 on the sever 100 receives a media stream. The TBF also receives some system data. The token bucket size is calculated based on the connection speed received from the probe mode module 315 and the client buffer 140 size received from the monitor module 320 (receiving the TCP data). The TBF 310 processes the media stream and discards some video data based on a number of available tokens in the token bucket. Subsequently, a filtered outgoing media stream is sent to the client and received in the client buffer 140. Note that the system data is separated in block 145 on the client, and only the media data is stored in the client buffer 140. The protocol that is being used (Flash uses RTMP, for example) marks each sent packet to show what data it contains: audio, video, system. The media data goes into the client buffer to allow smooth playback, while system data is usually processed immediately upon reception.

Those skilled in the art will appreciate that the proposed method provides for an uninterrupted remote conferencing by filtering out the video data and sending the audio data if the communication channel bandwidth is not sufficient for sending video or the bandwidth is temporarily reduced.

Figure 4:
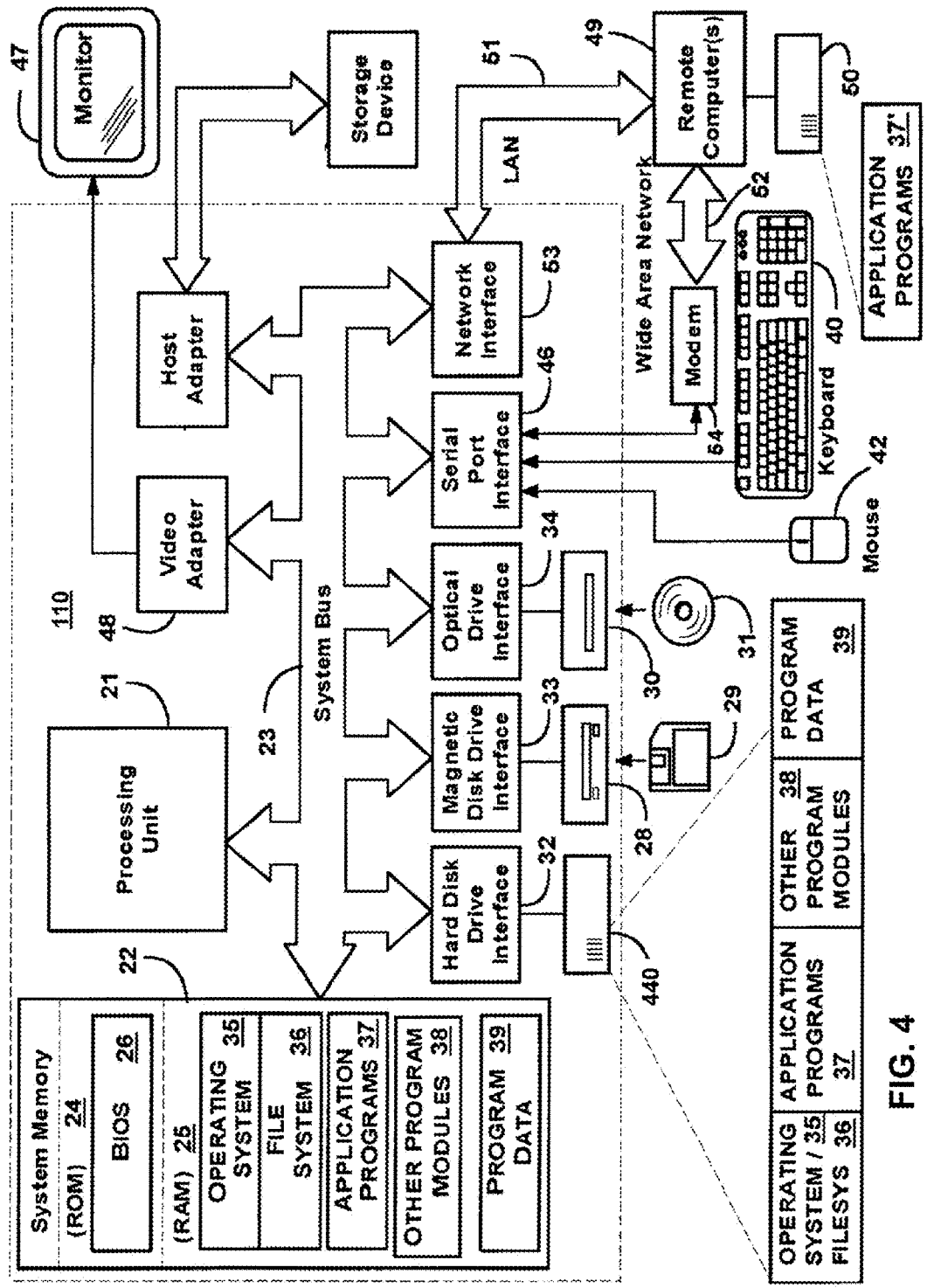
FIG. 4 illustrates a schematic diagram of an exemplary computer or server that can be used in the invention.

With reference to FIG. 4, an exemplary system for implementing the invention includes a general purpose computing device in the form of a personal computer 110 or server 100 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 110, such as during start-up, is stored in ROM 24. The personal computer 110 may further include a hard disk drive 440 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 440, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 110.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 110 includes a file system 36 associated with or included within the operating system 35, such as the WINDOWS NT™ File System (NTFS), one or more application programs 37, other program modules 38 and program data 39. A user may enter commands and information into the personal computer 110 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the computer 20.

The computer 110 may further include a memory storage device 50. The logical connections include a local area network (LAN) 51 and a wide area network (WAN) 52. Such networking environments are commonplace in offices, enterprise-wide computer networks, Intranets and the Internet.

When used in a LAN networking environment, the personal computer 110 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46.

In a networked environment, program modules depicted relative to the personal computer 110, or portions thereof, may be stored in the remote memory storage device. It will be appreciated that the network connections shown are exemplary and other means of establishing a communications link between the computers may be used.

Having thus described the different embodiments of a system and method, it should be apparent to those skilled in the art that certain advantages of the described method and apparatus have been achieved. In particular, it should be appreciated by those skilled in the art that the proposed method provides for an uninterrupted remote conferencing by filtering out the video data and sending the audio data, if the communication channel bandwidth is not sufficient or is temporarily reduced.

It should also be appreciated that various modifications, adaptations, and alternative embodiments thereof may be made within the scope and spirit of the present invention. The invention is further defined by the following claims.

What is claimed is:

1. A computer-implemented method for prioritizing audio data in a network media stream, the method comprising:
   a) establishing a network connection between a server and a client with an initial connection speed;
   b) providing a media stream to be sent from the server to the client, the media stream comprising a video data and an audio data and having a transmission speed M, wherein a transmission speed is determined by transmitting a garbage data stream at the initial connection speed on the network connection, using a probe mode, gradually increasing a speed of transmission by a delta of 5-200 kbits/s up to a measured effective maximum connection speed CS that is equal to media stream bitrate, wherein the probe mode has a duration of 1-5 seconds;
   c) setting a server-client with the measured connection speed according to b) as N;
   d) creating a token bucket of a size BS for the connection with the measured speed N on the server;
   e) adding tokens into the token bucket at a speed of N tokens per second;
   f) determining a size of a next video frame within the media stream so as to decide whether the frame should be transmitted or discarded;
   g) calculating a number of the tokens located in the token bucket;
   h) sending the video frame to the client, if the number of the tokens exceeds the video frame size, wherein the video data is stored in a client buffer;
   i) discarding a number of the tokens corresponding to the video frame size;
   j) discarding the video frame and keeping the tokens in the token bucket, if the number of the tokens is smaller than the video frame size; and
   k) sending the audio data to the client, wherein the audio data is stored in a client buffer, the client buffer has a size CB, wherein the audio data and the video data are processed by a frame filter that transmits or discards the frames of the audio data and the video data.

2. The method of claim 1, wherein the token bucket is controlled by a token bucket filter (TBF).

3. The method of claim 1, wherein the size of the token bucket BS is calculated as BS=CS*CB.

4. The method of claim 3, wherein a maximum size of a transmitted video frame does not exceed the BS.

5. The method of claim 1, wherein the audio data is assigned a higher priority rating than the video data by the frame filter.

6. The method of claim 1, wherein the garbage data stream is sent over the sever-client connection in a probe mode.

7. The method of claim 6, wherein the audio data is sent to the client, if the number of the tokens is less than the size of the data.

8. The method of claim 1, further comprising discarding a video frame if the video frame depends on a previously discarded base frame.

9. A system for prioritizing audio data in a network media stream, comprising:
   a processor;
   a memory; and
   a computer program logic stored in the memory and executed on the processor, the computer program logic for executing the steps:
   a) establishing a network connection between a server and a client with an initial connection speed;
   b) providing a media stream to be sent from the server to the client, the media stream comprising a video data and an audio data and having a transmission speed M, wherein a transmission speed is determined by transmitting a garbage data stream at the initial connection speed on the network connection, using a probe mode, gradually increasing a speed of transmission by a delta of 5-200 kbits/s up to a measured effective maximum connection speed CS that is equal to media stream bitrate, wherein the probe mode has a duration of 1-5 seconds;
   c) setting a server-client with the measured connection speed according to b) as N;
   d) creating a token bucket of a size BS for the connection with the measured speed N on the server;
   e) adding tokens into the token bucket at a speed of N tokens per second;
   f) determining a size of a next video frame within the media stream so as to decide whether the frame should be transmitted or discarded;
   g) calculating a number of the tokens located in the token bucket;
   h) sending the video frame to the client, if the number of the tokens exceeds the video frame size, wherein the video data is stored in a client buffer;
   i) discarding a number of the tokens corresponding to the video frame size;
   j) discarding the video frame and keeping the tokens in the token bucket, if the number of the tokens is smaller than the video frame size; and
   k) sending the audio data to the client, wherein the audio data is stored in a client buffer, the client buffer has a size CB, wherein the audio data and the video data are processed by a frame filter that transmits or discards the frames of the audio data and the video data.

* * * * *